United States Patent [19]

Muellen et al.

[11] Patent Number: 5,405,962
[45] Date of Patent: Apr. 11, 1995

[54] QUATERRYLENETETRACARBIMIDES

[75] Inventors: Klaus Muellen; Heribert Quante, both of Cologne, Germany

[73] Assignee: BASF Aktiengesellschaft, Ludwigshafen, Germany

[21] Appl. No.: 142,926

[22] Filed: Oct. 29, 1993

[30] Foreign Application Priority Data

Oct. 31, 1992 [DE] Germany ............ 42 36 885.5

[51] Int. Cl.$^6$ ............................. C07D 471/02
[52] U.S. Cl. ............................. 546/27
[58] Field of Search ........... 546/23, 27; 8/636, 648

[56] References Cited

U.S. PATENT DOCUMENTS

| | | | |
|---|---|---|---|
| 1,715,430 | 6/1929 | Schmidt et al. | 546/27 |
| 1,878,986 | 9/1932 | Schmidt et al. | 546/27 |
| 1,972,095 | 9/1934 | Gubelmann et al. | 546/27 |
| 2,036,663 | 4/1936 | Weiland et al. | 546/27 |
| 4,556,622 | 12/1985 | Leumann et al. | 546/27 |
| 5,294,512 | 3/1994 | Suzuki et al. | 546/27 |

OTHER PUBLICATIONS

Chemische Berichte, Bd. 124, Nr. 9, Sep. 1991, pp. 2091–2100, Karl-Heinz Koch, et al., "Synthesis of Tetraalkyl-Substituted Oligo (1,4-Naphthylene)s and Cyclization to Soluble Oligo (peri-naphthylene)s".
Chemical Abstracts, vol. 66, No. 12, Mar. 20, 1967, AN 47291y, Yoshio Nagai, et al., "Long Quinone-Type Compounds. III. Synthesis of 3,4(CO), 13(CO), 14-Dibenzoylenequaterrylene", p. 4489.
Dyes and Pigments, Bd. 16, pp. 19–25, 1991, Yukinori Nagao, et al., "Synthesis and Properties of N-Alkyl-bromoperylene . . . ".
Chemische Berichte, Bd. 81, pp. 52–63, 1948, Clemens Schoupf.

*Primary Examiner*—C. Warren Ivy
*Assistant Examiner*—A. A. Owens
*Attorney, Agent, or Firm*—Oblon, Spivak, McClelland, Maier, & Neustadt

[57] ABSTRACT

Quaterrylene useful as pigments or fluorescent dyes have the formula

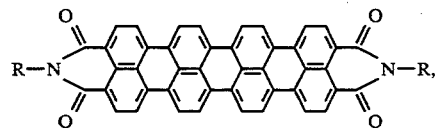

where the two radicals R are each hydrogen, substituted or unsubstituted $C_1$–$C_{20}$-alkyl or substituted or unsubstituted phenyl.

5 Claims, No Drawings

QUATERRYLENETETRACARBIMIDES

The present invention relates to novel quaterrylene of the formula I

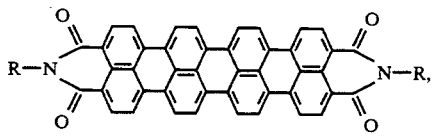

where the two radicals R are identical or different and are independently of each other hydrogen, $C_1$-$C_{20}$-alkyl, which may be interrupted by from 1 to 4 oxygen atoms in ether function, by from 1 to 4 imino groups or by from 1 to 4N—($C_1$-$C_4$-alkyl)imino groups, or unsubstituted or $C_1$-$C_4$-alkyl-substituted phenyl, to a process for preparing them and to their use as fluorescent dyes or pigments.

The basic quaterrylene is known from Chem. Ber. 81 (1948), 52–63, where it is obtained by heating perylene in benzene in the presence of aluminum chloride and bromine.

Furthermore, Dyes and Pigments 16 (1991), 19–25, describes N-alkylperylimides linked to each other via a single chemical bond (biperylimides). They are synthesized from the corresponding bromoperylimides by an Ullmann reaction, ie. in the presence of copper bronze. However, this type of reaction provides only biperylimides that have short alkyl chains ($C_2$-$C_4$).

It is an object of the present invention to provide novel quaterrylene compounds. Another object is to provide novel methods of synthesis which make it possible to prepare differently substituted quaterrylene in a simple manner in high yield and purity starting initially from the corresponding haloperylimides and then from the corresponding biperylimides.

We have found that the first object is achieved by the quaterrylene of the formula I defined at the beginning.

Any alkyl appearing in the formula I may be straight-chain or branched.

Any $C_1$-$C_4$-alkyl-substituted phenyl appearing in the formula I may have in general from 1 to 3 of these $C_1$-$C_4$-alkyl substituents.

Suitable radicals are for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl (the above designations isooctyl, isononyl, isodecyl and isotridecyl are trivial names derived from the oxo process alcohols-cf. Ullmanns Encyklopädie der technischen Chemie, 4th edition, volume 7, pages 215 to 217, and volume 11, pages 435 and 436), 2-methoxyethyl, 2-ethoxyethyl, 2-propoxyethyl, 2-isopropoxyethyl, 2- butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- or 4-butoxybutyl, 4,8-dioxadecyl, 3,6,9-trioxadecyl, 3,6,9-trioxaundecyl, 3,6,9-trioxadodecyl, 3,6,9,12-tetraoxatridecyl, 3,6,9,12-tetraoxatetradecyl, 2-dimethylaminoethyl, 2- or 3-dimethylaminopropyl, 2- or 4-dimethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl, 3,6,9-trimethyl-3,6,9-triazaundecyl, 12-methyl-3,6,9,12-tetraazatridecyl, 3,6,9,12-tetramethyl-3,6,9,12-tetraazatridecyl, 3,6,9,12-tetraazatetradecyl, phenyl, 2-, 3- or 4-methylphenyl, 2,4- or 2,6-dimethylphenyl, 2,4,6-trimethylphenyl, 2-, 3- or 4-ethylphenyl, 2,4- or 2,6-diethylphenyl, 2,4,6-triethylphenyl, 2-, 3- or 4-propylphenyl, 2,4- or 2,6-dipropylphenyl, 2,4,6-tripropylphenyl, 2-, 3- or 4-isopropylphenyl, 2,4- or 2,6-diisopropylphenyl, 2,4,6-triisopropylphenyl, 2-, 3- or 4-butylphenyl, 2,4- or 2,6-dibutylphenyl, 2,4,6-tributylphenyl, 2-, 3- or 4-isobutylphenyl, 2,4- or 2,6-diisobutylphenyl, 2,4,6-triisobutylphenyl, 2-, 3- or 4-sec-butylphenyl, 2,4- or 2,6-di-sec-butylphenyl or 2,4,6-tri-sec-butylphenyl.

Preference is given to quaterrylene of the formula I in which the radicals R are independently of each other hydrogen or $C_1$-$C_1$-alkyl.

Preference is further given to quaterrylene of the formula I in which the radicals R are independently of each other $C_8$-$C_{18}$-alkyl or $C_1$-$C_4$-alkyl-disubstituted phenyl.

Particular preference is given to quaterrylene of the formula I in which the radicals R are independently of each other hydrogen, methyl or ethyl.

Particular preference is further given to quaterrylene of the formula I in which the radicals R are independently of each other $C_8$-$C_{13}$-alkyl or propyl- or isopropyl-disubstituted phenyl.

We have also found that the quaterrylene of the formula I are obtained in an advantageous manner on treating biperylenes of the formula II

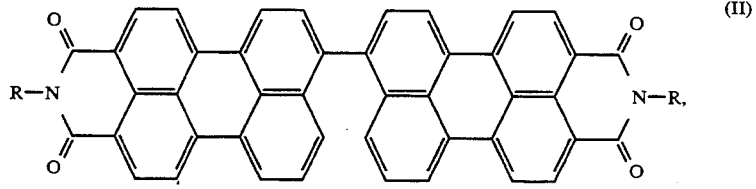

where the radicals R are each as defined above, with an oxidizing agent in an alkaline reaction medium.

Suitable oxidizing agents are for example glucose, aluminum chloride, iron(III) chloride, manganese dioxide, palladium(II) acetate, thallium(III) trifluoroacetate, thallium(III) acetate, vanadium trifluoride oxide, vanadium trichloride oxide, cadmium(II) chloride, copper(II) chloride and sodium formaldehydesulfoxylate.

The process of the invention is advantageously carried out at from 60° to 180° C., preferably at from 130° to 160° C., if desired under a protective gas atmosphere, for example argon.

The alkaline reaction medium used is advantageously a mixture of an alkali metal hydroxide and a $C_1$-$C_4$- alkanol. The alkali metal hydroxide used is advantageously sodium or potassium hydroxide and the alkanol used is advantageously methanol, ethanol, propanol, isopropanol, butanol, isobutanol or sec-butanol.

In terms of the weight of biperylene of the formula II, the alkali metal hydroxide is in general used in an amount of from 3000 to 20000% by weight, preferably from 3000 to 5000% by weight, and the $C_1$-$C_4$-alkanol in an amount of from 2000 to 20000% by weight, preferably from 3000 to 5000% by weight.

The preferred oxidizing agent glucose is used in a from 10 to 40 molar, preferably from 15 to 25 molar, excess per mole of biperylene of the formula II.

The novel process is advantageously carried out by introducing the biperylene II, the alkali metal hydroxide, the $C_1$-$C_4$-alkanol and the glucose as the initial charge and heating to the abovementioned temperature, if desired under a protective gas atmosphere. After the reaction has ended, which in general will take from 1 to 2 hours, the mixture is cooled down and acidified with a mineral acid, for example hydrochloric acid, and the precipitated quaterrylene I is filtered off with suction, washed and dried. Any by-products can be removed by extraction with inert solvents, eg. chloroform, diethyl ether, methyl tert-butyl ether or toluene.

We have further found that the preparation of biperylenes of the formula II is advantageously possible by treating a haloperylimide of the formula III

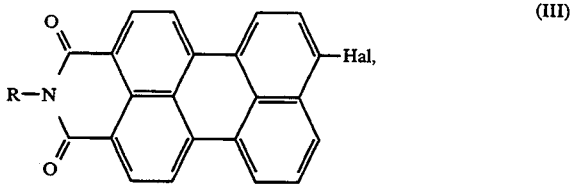
(III)

where Hal is chlorine or bromine, preferably bromine, and R is as defined above, in an inert diluent in the presence of an organometallic catalyst.

Suitable inert diluents are for example carboxamides, such as N,N-dimethylformamide or N,N-dimethylacetamide, ethers, such as dimethyl ether, 1,2-dimethyloxyethane or tetrahydrofuran, or aromatics, such as benzene, toluene or xylene.

Suitable organometallic catalysts are for example bis(1,5-cyclooctadiene)nickel, bis(triphenylphosphine)-nickel(II) chloride, tetrakis(triphenylphosphine)nickel, tetrakis(triphenylphosphine)palladium and [1,2-bis(diphenylphosphino)ethane]nickel(II) chloride.

The use of organonickel catalysts is preferred.

It is also possible to form the catalysts in situ. This may be done using metal salts or compounds, oxidizing or reducing agents as the case may be, and the appropriate ligands. Suitable ligands are for example triphenylphosphine, cyclooctadiene, bipyridyl, trifluorophosphine, η-, δ- or π-bonded olefins, cycloolefins, aromatics or antiaromatics, hydrogen, carbonyls and halogens.

The process of the invention is advantageously carried out at from 40° to 80° C., preferably at from 60° to 65° C. if desired under a protective gas atmosphere, for example argon.

In terms of the weight of the bromoperylimide III, it is customary to use from 2000 to 10000% by weight, preferably from 4000 to 5000% by weight, of the inert diluent and from 30 to 80% by weight, preferably from 45 to 55% by weight, of the organic nickel complex.

The novel process is advantageously carried out by introducing the haloperylimide III, the inert diluent and the organometallic catalyst as the initial charge and heating to the abovementioned temperature, if desired under a protective gas atmosphere. After the reaction has ended, which in general takes from 36 to 48 hours, the reaction mixture is cooled down and poured into water, which may additionally contain methanol, and the mixture is acidified with a mineral acid, for example hydrochloric acid. The precipitated target product of the formula II is then filtered off with suction, washed and dried.

The novel quaterrylene of the formula I are very useful as pigments or fluorescent dyes. They can also be used as photoconductors.

Particularly useful pigments are those quaterrylenes of the formula I in which the radicals R are independently of each other hydrogen or $C_1$-$C_4$-alkyl.

Particularly useful fluorescent dyes are those quaterrylene of the formula I in which the radicals R are independently of each other $C_8$-$C_{18}$-alkyl or $C_1$-$C_4$-alkyl-disubstituted phenyl.

Embodiments of the invention will now be more particularly described by way of example.

EXAMPLE 1

10 g (25 mmol) of 3,4:9,10-perylenetetracarboxylic dianhydride and 56.6 g (0.3 mol) of dodecylamine were dissolved in a mixture of 600 ml of propanol and 400 ml of water. The reaction mixture was stirred at 60°-65° C. for 7 hours. After cooling, it was acidified with concentrated hydrochloric acid, and the resulting precipitate was filtered off, thoroughly washed with water and dried under reduced pressure. The mixture obtained, comprising about 20% by weight of perylene bisdicarboximide and about 80% by weight of 3,4:9,10-perylenetetracarboxylic acid 3,4-anhydride 9,10-imide, can be used directly for the next reaction step.

EXAMPLE 2

12.5 g of a mixture of Example 1 and 250 ml of 2% strength by weight potassium hydroxide solution were heated in an autoclave at 220°-230° C. for 18 hours. After cooling, the reaction mixture was filtered, and the precipitate was washed neutral with water, dried under reduced pressure and extracted with diethyl ether. The solvent was removed, the residue was taken up in a little methylene chloride, and 400 ml of methanol were added. The precipitate was filtered off, washed with methanol and dried under reduced pressure to leave N-dodecyl-3,4-perylenedicarboximide as a red powder in a yield of 80% (based on perylenetetracarboxylic acid 3,4-anhydride 9,10-imide). The melting point is 178°-179° C.

EXAMPLE 3

2.5 g (5.1 mmol) of the perylenedicarboximide of Example 2 were dissolved in 750 ml of methylene chloride. Following the addition of a spatula tip of iron powder, 8 g (50 mmol) of bromine in 50 ml of methylene chloride were added dropwise at room temperature over 15 minutes. The temperature was slowly raised, and the reaction mixture was refluxed for 3 hours with stirring. After cooling, the solvent was removed in a rotary evaporator, the residue was taken up in a little methylene chloride, and 500 ml of methanol were added. The solution was left to stand overnight in a refrigerator, and the precipitate was filtered off, washed thoroughly with methanol and dried under reduced pressure to leave the bromine compound of the formula

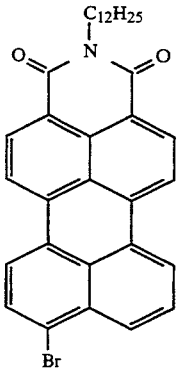

(melting point: 161° C.) as a red powder in a yield of 92%.

EXAMPLE 4

In a Schlenk flask, 180 mg (0.67 mmol) of bis-1,5-cyclooctadiene)nickel, 105 mg (0.67 mmol) of 2,2'-bipyridyl and 600 mg (5.6 mmol) of 1,5-cyclooctadiene were dissolved in 15 ml of absolute N,N-dimethylformamide under argon. Then 382 mg (0.67 mmol) of N-dodecyl-9-bromoperylene-3,4-dicarboximide (from Example 3) were added under a counterstream of argon. The reaction mixture was stirred at 60°-65° C. for 36 hours, during which a reddish brown precipitate formed. After the reaction had ended, the mixture was cooled down to room temperature and poured into a solution of 30 ml of concentrated hydrochloric acid, 30 ml of water and 60 ml of methanol. The precipitate was filtered off with suction, washed with water, saturated aqueous potassium carbonate solution, water and methanol, and dried under reduced pressure to leave a red product of the formula

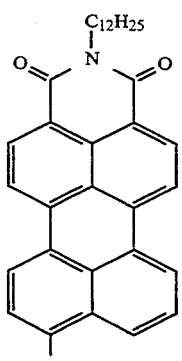

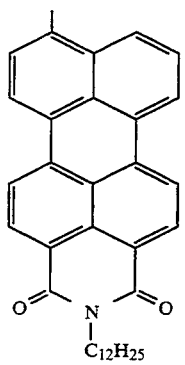

(yield: 90%). The product did not have a melting point below 300° C.

EXAMPLE 5

100 g of pulverized potassium hydroxide, 100 ml of ethanol, 4 g of glucose and 1 g (1 mmol) of N,N'-didodecyl-1,1'-diperylene-6,7:6',7'-bisdicarboximide (from Example 4) were heated at 150°-160° C. (bath temperature) under argon for 75 minutes. After cooling, 600 ml of water were added to the reaction mixture. After 200 ml of concentrated hydrochloric acid had been added, the mixture was refrigerated for 3-4 hours to allow the precipitate to form. It was filtered off and washed with saturated aqueous potassium carbonate solution, water, methanol and ether. The soluble by-products were removed by extraction with chloroform, leaving the quaterrylenebisdicarboximide of the formula

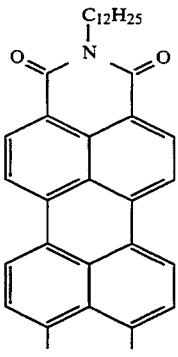

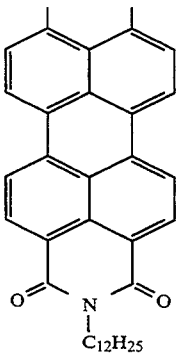

as a black powder which did not have a melting point below 300° C., The yield was 40%.

Physical data

FD-MS: (m/e) 975.3 (M+) UV/VIS: $\lambda_{max}$=791 nm (CHCl$_3$) Solid C$^{13}$-NMR: Carbonyl C: $\delta$=161.54 ppm Aromatic C: broad signal with maximum at $\delta$=128.99 ppm Alkyl C:C$_{12}$ $\delta$=14.42 ppm C$_{11}$ $\delta$=23.43 ppm C$_2$-C$_{10}$ $\delta$=30.75 ppm C$_1$ $\delta$=40.60 ppm

We claim:

1. Quaterrylene of the formula I

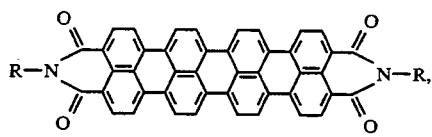

where the two radicals R are identical or different and are independently of each other hydrogen, C$_1$-C$_{20}$-alkyl, which may be interrupted by from 1 to 4 oxygen atoms in ether function, by from 1 to 4 imino groups or by from 1 to 4 N—(C$_1$-C$_4$-alkyl)imino groups, or unsubstituted or C$_1$-C$_4$-alkyl-substituted phenyl.

2. Quaterrylene as claimed in claim 1, wherein the radicals R are independently of each other hydrogen or C$_1$-C$_4$-alkyl.

3. Quaterrylene as claimed in claim 1, wherein the radicals R are independently of each other C$_8$-C$_{18}$-alkyl or C$_1$-C$_4$-alkyl-disubstituted phenyl.

4. A process for preparing quaterrylene as claimed in claim 1, which comprises treating biperylenes of the formula II

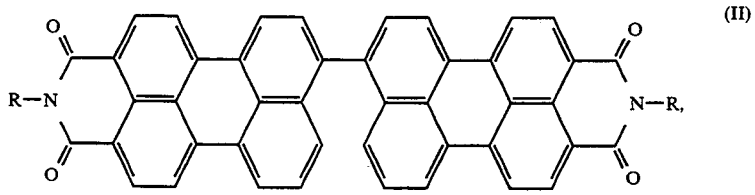

where the radicals R are each as defined in claim 1, with an oxidizing agent in an alkaline reaction medium.

5. A process for preparing biperylenes of the formula II

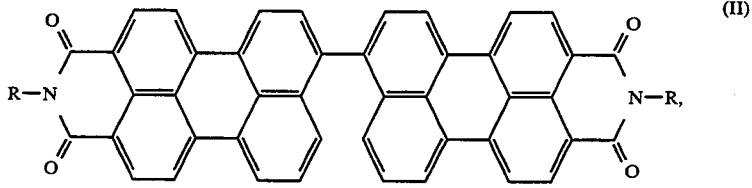

where the radicals R are each as defined in claim 1, which comprises treating a haloperylimide of the formula III

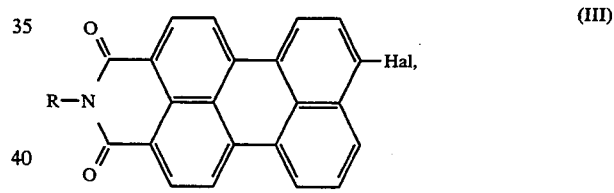

where Hal is chlorine or bromine and R is as defined in claim 1, in an inert diluent in the presence of an organometallic catalyst.

* * * * *

UNITED STATES PATENT AND TRADEMARK OFFICE
CERTIFICATE OF CORRECTION

PATENT NO. : 5,405,962
DATED      : April 11, 1995
INVENTOR(S) : Klaus MUELLEN, et al.

It is certified that error appears in the above-indentified patent and that said Letters Patent is hereby corrected as shown below:

On the title page, Item [75], both inventors' city of residence should read:

--Koeln--

Signed and Sealed this

Thirtieth Day of May, 1995

*Attest:*

BRUCE LEHMAN

*Attesting Officer*  *Commissioner of Patents and Trademarks*